3,566,669
Patented Mar. 2, 1971

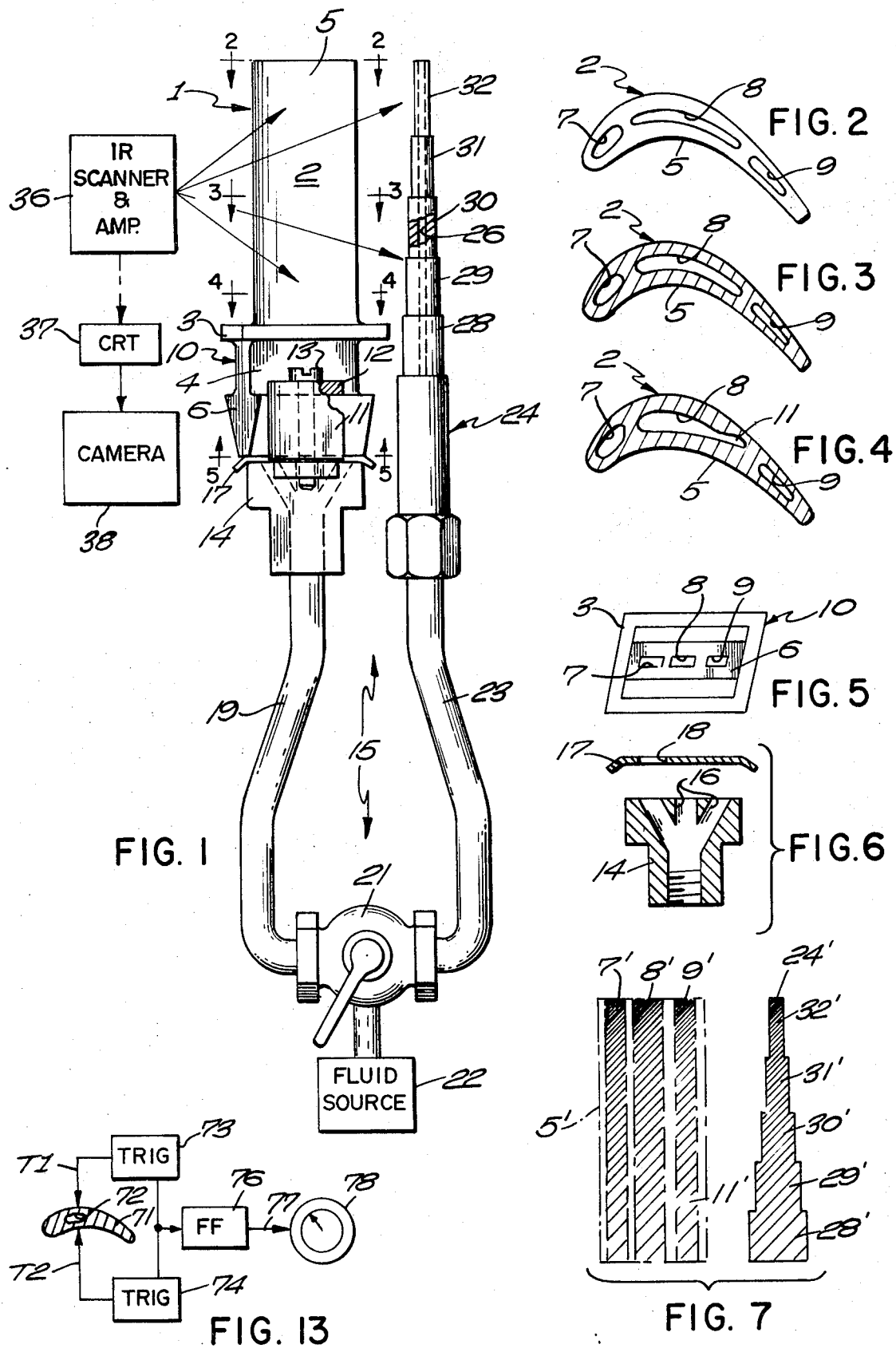

3,566,669
METHOD AND APPARATUS FOR THERMALLY EXAMINING FLUID PASSAGES IN A BODY
Willis Thompson Lawrence, Winchester, Domenico S. Sarcia, Saugus, and David B. Spaulding, Carlisle, Mass., assignors to Harry Parker, West Hartford, Conn.
Filed Sept. 4, 1968, Ser. No. 757,435
Int. Cl. G01n 25/00
U.S. Cl. 73—15                           12 Claims

ABSTRACT OF THE DISCLOSURE

The thickness of walls around cooling passages through a turbine blade is detected by passing a heated or cooled fluid through the passages and sensing the resulting temperature pattern on the exterior of the walls. The temperature pattern may be compared with the pattern on a standard body having known graduated wall thicknesses and simultaneously supplied with the same fluid. Or an obstruction in a passage may be detected by comparison of temperatures at adjacent exterior areas of the body.

---

This invention relates to the examination and measurement of the relative dimensions of passages in a body and of the body walls around the passages, particularly where the passages are inaccessible for direct measurement, and when the bodies must be examined at a relatively more rapid rate than is possible by known methods or where an obstruction in a passage is nonmetallic and cannot be detected by X-ray photography. In a body such as the turbine blades of a jet engine, for example, there are one or more internal cooling passages usually running longitudinally from the inner to outer end of the blade. In some instances the passage opens at the outer end of the blade. In other instances a space at the outer end is capped by a plate welded over the space and additional passages conduct the cooling fluid to an exit laterally of the blade. In both instances it is important that the longitudinal passages and walls be of a predetermined cross-section to insure adequate and uniform cooling and minimal thermal stress during operation. But the narrow long passages prevent direct measurement. In the second instance the welding of the cap not only completely prevents direct measurement, but also may cause obstruction of the passages as a result of faulty welding. There is therefore a problem both of detecting deviation from predetermined wall and passage dimensions, and of the extreme second instance where the wall thickness is so grossly increased relative to the passage as to obstruct fluid flow through the passage.

The object of the present invention is to provide a way of examining such inaccessible passages in a body for deviations and obstructions, which is nondestructive, rapid and reliable.

According to the invention a method of nondestructive examination of a passage formed interiorly of a body by the walls thereof comprises: initially maintaining the body substantially uniformly at a first predetermined temperature, momentarily flowing a fluid undirectionally into and through said passage and thence out of said body at a second predetermined temperature substantially different from the first predetermined temperature thereby to cause simultaneous thermal excursions at locations on the exterior of said body by heat conduction through the walls between said passage and exterior, and detecting the relative temperatures of locations along the exterior of the body adjacent the passage, thereby to indicate the relative dimensions of the walls and passages.

Figure 8:
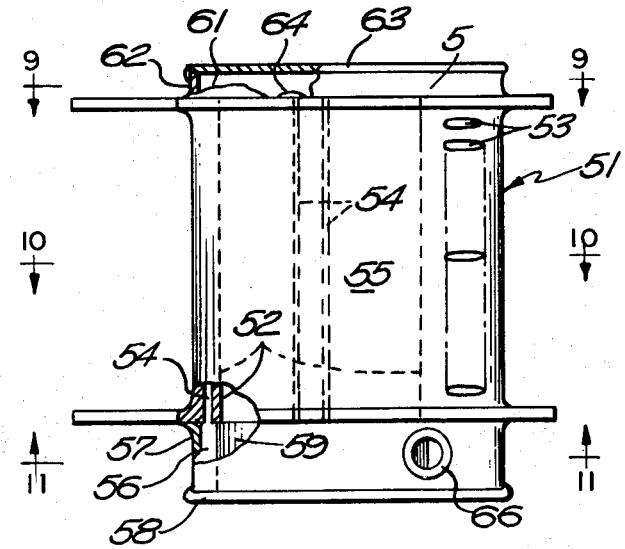
Figure 9:
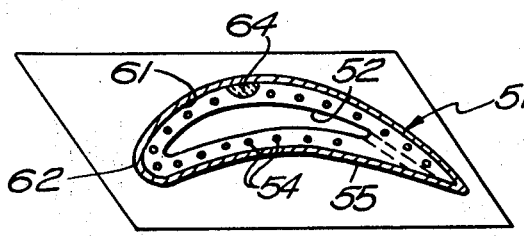
Figure 10:
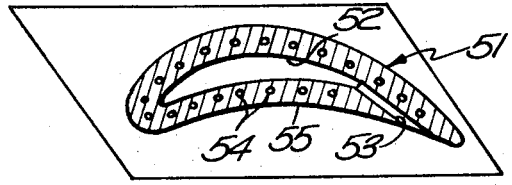
Figure 11:
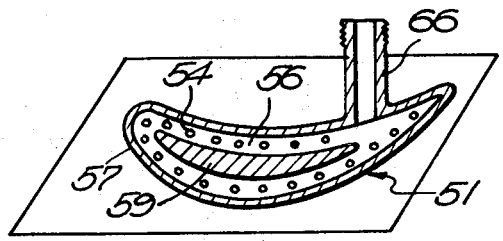
Figure 12:
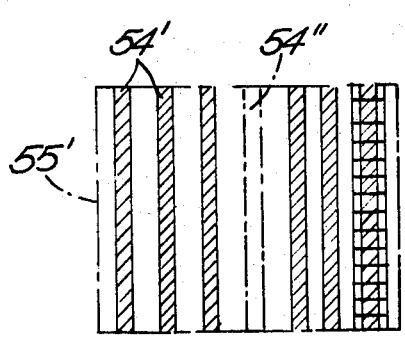
Figure 14:
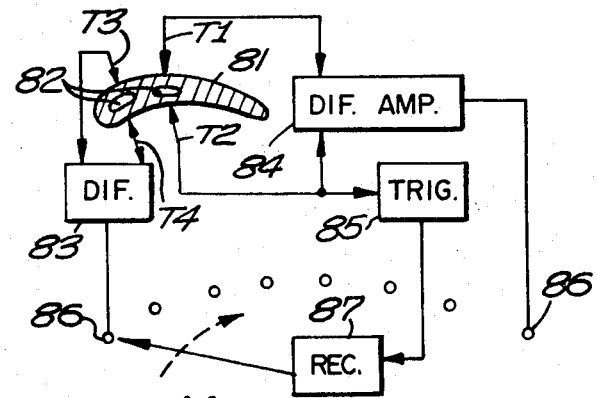

For the purpose of illustration typical embodiments of the invention are shown in the accompanying drawings in which:

FIG. 1 is an elevation of apparatus for comparing an open ended turbine blade with a standard tube of graduated wall thickness;
FIGS. 2 to 5 are horizontal sections on lines 2—2 to 5—5 of FIG. 1;
FIG. 6 is a vertical section at a right angle to line 5—5 of FIG. 1;
FIG. 7 is a thermograph of the blade and standard tube of FIG. 1;
FIG. 8 is an elevation of another form of turbine blade;
FIGS. 9 to 11 are sections on lines 9—9 to 11—11 of FIG. 8;
FIG. 12 is a thermograph of the blade of FIG. 8; and
FIGS. 13 and 14 are schematic diagrams of thermocouple systems for examining turbine blades.

Shown in FIGS. 1 to 5 is an open ended, metal turbine blade 1 comprising a vane portion 2 with a concave surface 5 extending upwardly from a base 10 which includes a shelf 3, a shank 4 and a keystone-shaped shoulder 6. In a turbine the blade is anchored by the base with the vane extending radially outwardly from the base. At the outer end of the vane (FIG. 2) are seen three passages 7, 8 and 9 which, in operation, conduct a cooling fluid outwardly from the base. As the vane approaches the base its external dimensions thicken as can be seen in FIGS. 2, 3 and 4 and the central passage 8 becomes wider to increase the cross-sectional area of the passage proportionately to the general increase in thickness of the walls around the passages. In FIG. 4 is shown an undesired deviation 11 in the passage 8 which increases the effective dimension or thickness of the wall between the passage 8 and the vane face 5. The three passages 7, 8 and 9 enter at the end of the keystone-shaped shoulder 6 (FIG. 5).

The blade is clamped to a manifold block of a test fixture 15 comprising a pair of clamps 11 (of which one is shown) each having a flange 12 pressed against the outer end of the keystone-shaped shoulder 6 by a screw 13 anchored in the manifold block 14. The clamp shown is illustrative. A quick-acting lever clamp is used for rapid testing. The manifold has three ports 16 matching the three entrances 7, 8 and 9 in the blade 1. One or more of the entrances may be selected by use of a masking plate 17 having an aperture 18 at the selected passage, the masking plate being clamped between the manifold 14 and the vane base 10. The manifold is connected by a pipe 19 to fluid dividing valve 21 which supplies a test fluid from a source 22 simultaneously both through the pipe 19 to the manifold and through a pipe 23 to a standard tube 24.

The standard tube 24 has a constant diameter bore 26 enclosed by walls 28 to 32 of thicknesses graduated through a range encompassing the various wall thicknesses around the passages 7 to 9 of the vane 2. The thickness of wall 31, for example, is approximately the same as that of the relatively thin wall around the passage 9 at the outer end of the vane as shown in FIG. 2, whereas the thickness of wall 28 is comparable to that between passage 8 and face 5 of the thicker inner end of the vane, as shown in FIG. 4. The standard tube is made of the same or a similar metal as the blade and has the same finish coat as the blade, or a finish of the same thermal emissivity.

The test apparatus shown in FIG. 1 operates as follows. The standard tube 24 and the blade 2 clamped in the fixture 15 are brought uniformly to a predetermined temperature. The normal range of room temperature is convenient. For a fraction of a second the valve 21 is operated to connect the fluid source 22 simultaneously to the blade 1 and the standard tube 24. The source 22 supplies a test fluid at a selected temperature higher or lower than the room or other predetermined initial temperature of the blade. Heat transfer between the exterior and passages of the blade and tube begins immediately, and the exterior surface temperature begins a thermal excursion toward the fluid temperature. Given a period of a few seconds the external temperature would become nearly uniform over the entire exterior surface of the vane. But the surface may be examined thermally within a fraction of a second, during the excursion, while different locations on the surface will exhibit different temperatures dependent on the relative dimensions of the walls and passages at the various locations. Simultaneously the graduated sections of the standard 24 will exhibit several distinct temperatures.

As shown in FIG. 1 a preferred apparatus for thermal examination of the blade and standard is an infrared scanner 36 such as AGA Thermovision Model 661. Such a scanner makes a spot by spot, line by line scan across the face 5 of the vane and also the surface of the standard, generating electrical signals proportional in amplitude to the temperature of successively scanned spots, similarly as a television camera generates video signals. The thermal signals are amplified in the scanner and applied to a conventional cathode ray tube 37 which then displays on its screen a visible image of the thermal pattern on the blade face 5 and standard 24. The image is recorded by a camera 38 suitable for CRT photography. The complete cycle of fluid supply and recording occurs within a third to one-half a second.

FIG. 7 illustrates somewhat idealistically a recorded thermograph of the temperature patterns on the vane 2 and standard 24, relatively dark areas representing relatively cool temperatures when a cold test fluid is used. The thermal image 24' of the standard has areas 28' to 32' of stepwise darker shade corresponding to the stepwise thinner walls 28 to 32 of the standard, the thinner wall 32 cooling the exterior surface faster than the thicker wall 28. Thus the density of shading in the standard image 24' represents wall thicknesses of known dimensions. The gradually shaded areas 7' to 9' of the vane thermograph 5' when compared in density to the standard thermograph correlate the wall thicknesses outside the passages 7 to 9 with the known wall thickness of the standard. Images 7' and 8' show a regular decrease in density from top to bottom indicating normal wall thickness around passages 7 and 8. But image 9' shows a light discontinuity 11' indicating the abnormal and undesired wall thickening 11 in the passage 9'. Furthermore, the density comparisons give a quantitative measurement of the vane wall thickness, the outer ends of the walls of passages 7 to 9 being of similar thickness as wall 32 of the standard, and the walls at the inner ends having the thickness of wall 29 of the standard.

As previously explained, the thermal patterns are developed by heat transfer with the fluid stream in the passages within a fraction of a second. With small masses and high fluid velocities only a small temperature gradient develops along the fluid stream due to heating or cooling of the test fluid during flow through the passages. Thus usually any hot or cold fluid such as water, air or steam can be used. For more precise measurement or where slow laminar flow is desired it has been found advantageous to use a fluid at or slightly above its boiling point. A gaseous or liquid fluid at or below condensing or above boiling temperature is in a state to give up or receive latent heat without changing temperature. Liquid Freon 12 ($CCl_2F_2$), boiling at −22.9 degrees F., is a particularly suitable fluid. Other hydrocarbons such as Freon 22 are also suitable. Freon supplied to the fixture from a source at room temperature but under high pressure is above its boiling point and in latent heat transfer state. And although it leaves the source 22 at room temperature, the release of pressure and consequent boiling and heat transfer with the pipes 19 and 23 lowers its temperature close to sea level boiling point before supply into the blade 1 and standard 24.

FIGS. 8 to 12 illustrate the detection of a passage obstruction in a different form of turbine blade 51 having a large central passage 52 with a plurality of tangential exits 53. The central passage is surrounded by fine cooling passages 54. At the lower end of the blade (FIG. 11) the fine passages communicate with a chamber 56 enclosed by a wall 57 to which is welded a cap 58 having an inwardly extending boss 59 which blocks direct communication of the central passage 52 with the chamber 56. At the upper end of the blade the passages 52 and 54 open into a chamber 61 surrounded by a wall 62 (FIG. 9). The chamber is closed by a cap 63 welded to the wall 62. As shown in FIGS. 8 and 9, occasionally the cap welding will result in the undesired deposit 64 of welding material over one of the fine passages 54, blocking the passage.

In operation and in testing, fluid enters the inner chamber 56 through a fitting 66, flows outwardly through the unblocked fine passages 54 to the outer chamber 61, and thence through the central passage 52 and out the exits 53.

To detect the obstruction 64 in the blade of FIGS. 8 to 12, the blade is brought to an initial predetermined temperature, then boiling Freon 12, for example, is briefly supplied through the fitting 66 and a thermograph is taken as in the apparatus of FIG. 1. An idealized form of such a thermograph 55' of the face 55 of the blade 51 is shown in FIG. 12 wherein dark areas represent relatively cold temperatures. Along the areas 54' representing surfaces outside the unblocked passages 54 the shading is dark indicating flow of the cold Freon. But the area 54'' is distinctly lighter indicating that the corresponding passage 54 is conducting little if any cooling fluid and is at least partially blocked.

While the infrared scanning and recording system of FIG. 1 is well suited to rapid testing of interiorly passaged bodies, other ways of sensing thermal patterns are suitable. In more simply passaged blades thermocouples may be placed in series on exterior surfaces of the walls exterior of the passages for electrically reading the temperatures at the locations of the thermocouples. Or the thermocouples may be arranged in pairs across blade sections that are designed to be symmetrical with respect to opposite wall thicknesses and passage. If in fact the walls opposite each side of the passage are of different thickness the respective temperatures of the external faces of the walls will differ and produce in the thermocouples a voltage difference related to the undesired difference in thicknesses.

One thermocouple sensing system is shown in FIG. 13 wherein a blade 71 has a passage 72 with walls of equal thickness between the passage and opposite exterior surfaces of the blade. On these walls a pair of thermocouples T1 and T2 are placed to sense the temperature change when a test fluid is passed through the blade. Each thermocouple generates a voltage whose amplitude is related to the surface temperature and applies the voltage to an electronic trigger circuit 73 or 74. The trigger circuits each are designed to emit one voltage pulse when a predetermined temperature between the initial blade temperature and that of the test fluid is reached. The voltage pulses are applied to a single input, bistable flip-flop which starts a clock when the flip flop is in one condition and stops it when the flip-flop is in its alternate condition. The first arriving voltage pulse changes the flip-flop from stop to start condition, and the second pulse changes it back. If the walls are of substantially equal thickness the clock will be started and stopped instantaneously. But if the walls on opposite sides of the passage 72 are of different thickness the predetermined temperature at one thermocouple will be reached first, generate a voltage pulse and cause the flip-flop to start the clock. When the second thermocouple reaches predetermined temperature the clock is stopped. The elapsed time registered on the clock not only indicates an undesired difference in wall thickness but also the magnitude of the difference. In practice a plurality of thermocouple pairs would be arranged along the passage.

Another thermocouplse sensing system is shown in FIG. 14 wherein a blade 81 has a plurality of passages 82. As in FIG. 13 pairs of thermocouples, of which pairs T1-T2 and T3-T4 are exemplary, are arranged on opposite sides of and along each passage. The temperature voltages of each pair are applied to a differential amplifier 84. Assuming the walls at thermocouples T1 and T2 are of different thicknesses the thermocouples will at any instant after the flow of test fluid sense different temperatures and generate proportionately different voltages. The differential amplifier 84 compares the different voltages and applies to its output 86 a corresponding difference in voltage. When one of the thermocouples reaches a predetermined temperature it fires a trigger circuit which causes a recorder 87 to rapidly scan the outputs 86 of the several differential amplifiers and record all the difference temperatures. Alternatively the recorder may be an electronic comparison system with a printed readout of the comparative test temperature information.

Thus it will be understood that the present disclosure is for the purpose of illustration only and that this invention includes all modifications and equivalents falling within the scope of the appended claims.

We claim:

1. The method of nondestructive examination of a passage formed interiorly of a body by the walls thereof comprising: initially maintaining the body substantially uniformly at a first predetermined temperature; momentarily flowing a fluid having a latent heat transfer state at a second predetermined temperature substantially different from the first predetermined temperature undirectionally into and through said passage in said state so as to remain substantially at said second predetermined temperature while exchanging heat with the body and, thence out of said body thereby causing simultaneous thermal excursions at locations on the exterior of said body by heat conduction through the walls between said passage and exterior; and, detecting the relative temperatures of locations along the exterior of the body adjacent to the passage.

2. The method according to claim 1 wherein said detecting occurs during the interval of said simultaneous thermal excursions.

3. The method according to claim 1 wherein said body is maintained in the range of room temperatures and said fluid is supplied to the body at or above a boiling point below said range.

4. The method according to claim 3 wherein said fluid is liquid Freon supplied to the body at or above its boiling point.

5. The method according to claim 1 characterized by simultaneously flowing the same said fluid at the same temperature through a passage of known dimension in a standard body with a plurality of known different wall thicknesses, detecting the thermal excursions on the exterior of said standard body, and comparing the thermal excursions of the two bodies.

6. The method of claim 1 further characterized by converting said relative temperatures into a visual indication of the effective dimensions of the walls.

7. The method of claim 1 further characterized by converting said relative temperatures into a visual indication of the fluid flow characteristics of the passage.

8. Apparatus for nondestructive examination of a passage formed interiorly of a body by the walls thereof, comprising:

a support having a fluid outlet and means to hold the body with its passage connected to said outlet;

a source of fluid having a latent heat transfer state at a temperature substantially different from the body temperature;

means to connect said source to said outlet to flow the fluid in said state through said passage and produce a transient thermal pattern on the exterior of the body; and means for detecting the thermal pattern on said exterior.

9. The apparatus of claim 8 further characterized by means for converting said detected thermal pattern into a visual indication of the effective dimensions of the walls.

10. The apparatus of claim 8 further characterized by means for converting said detected thermal pattern into a visual indication of the fluid flow characteristics of the passage.

11. Apparatus for nondestructive examination of a passage formed interiorly of a body by the walls thereof comprising:

a source of fluid having a latent heat transfer state at a temperature substantially different from the body temperature;

means to supply the fluid in said state to said passage to produce a transient thermal pattern on the exterior of the body;

means for detecting the changing temperatures at different locations in said pattern;

means responsive to the detecting means for registering temperature differences between temperatures at different predetermined locations in said thermal pattern; and trigger means responsive to a predetermined temperature difference registered by said registering means for causing the registering means to register the instantaneous temperature differences at said predetermined locations.

12. Apparatus for nondestructive examination of a passage formed interiorly of a body by the walls thereof comprising:

a source of fluid having a latent heat transfer state at a temperature substantially different from the body temperature;

means to supply the fluid in said state to said passage to produce a transient thermal pattern on the exterior of the body;

means for detecting the changing temperatures at different locations in said pattern;

means responsive to a predetermined temperature detected by said detecting means at one location for producing a first trigger signal;

means responsive to a predetermined temperature detected by said detecting means at another location for producing a second trigger signal; and timing means responsive to said first and second trigger signals for starting a timing period in response to said first trigger signal and terminating said timing period in response to said second trigger signal.

References Cited

UNITED STATES PATENTS

| 3,027,457 | 3/1962 | Mouly | 250—83.3 |
| 3,434,332 | 3/1969 | Maley | 73—15 |
| 3,427,861 | 2/1969 | Maley | 73—15 |
| 3,462,602 | 8/1969 | Apple | 250—83.3 |

OTHER REFERENCES

Vanzetti: "Thermal Imaging Test Production-Circuits," in Control Engineering, May 1967, p. 99.

JAMES J. GILL, Primary Examiner

H. GOLDSTEIN, Assistant Examiner

U.S. Cl. X.R.

250—83.3